Oct. 11, 1949.	F. B. AUBERT	2,484,602
COMBUSTION HEATING APPARATUS AND CONTROLS THEREFOR
Filed July 26, 1943	6 Sheets-Sheet 1

INVENTOR
Fred B. Aubert
BY Andrew K. Foulds
his ATTORNEY

Oct. 11, 1949.  F. B. AUBERT  2,484,602
COMBUSTION HEATING APPARATUS AND CONTROLS THEREFOR
Filed July 26, 1943  6 Sheets-Sheet 2

INVENTOR
Fred B. Aubert
BY
Andrew K. Foulke
his ATTORNEY

Oct. 11, 1949.  F. B. AUBERT  2,484,602
COMBUSTION HEATING APPARATUS AND CONTROLS THEREFOR
Filed July 26, 1943  6 Sheets-Sheet 3

INVENTOR
Fred B. Aubert
BY
Andrew K. Fielder
his ATTORNEY

Oct. 11, 1949.    F. B. AUBERT    2,484,602

COMBUSTION HEATING APPARATUS AND CONTROLS THEREFOR

Filed July 26, 1943    6 Sheets-Sheet 5

INVENTOR
Fred B. Aubert
BY
Andrew K. Fouts
his ATTORNEY

Oct. 11, 1949.  F. B. AUBERT  2,484,602
COMBUSTION HEATING APPARATUS AND CONTROLS THEREFOR
Filed July 26, 1943  6 Sheets-Sheet 6

INVENTOR
Fred B. Aubert
BY
Andrew K. Fowlds
his ATTORNEY

Patented Oct. 11, 1949

2,484,602

UNITED STATES PATENT OFFICE 2,484,602

COMBUSTION HEATING APPARATUS AND CONTROLS THEREFOR

Fred B. Aubert, Grosse Pointe, Mich.

Application July 26, 1943, Serial No. 496,099

21 Claims. (Cl. 158—28)

This invention relates to new and useful improvements in heating apparatus and more particularly to the control of burner operation.

An object of the invention is to provide a heating apparatus which is particularly adapted for the heating of enclosed spaces in aircraft such for example as the cabin or fuselage.

Another object is to provide a control for initiating a burner operating cycle.

Another object is to provide a control by which the supply of fuel is increased upon an increase in the rate of supply of combustion air.

Another object is to provide means assuring operation of the fuel igniting means prior to the supplying of fuel.

Another object is to provide for scavenging of the combustion chamber upon shutdown of the burner.

Another object is to provide a timed control for the heating apparatus.

The invention consists in the improved control system and device, the cooperative relation of parts and their groupment in cooperative relation, to be more fully described hereinafter and the novelty of which will be particularly pointed out and distinctly claimed.

In the accompanying drawings to be taken as a part of this specification there are fully and clearly shown several preferred embodiments of the invention, in which drawings.

Referring to the drawings by characters of reference, 1 designates generally a rectangular control mechanism casing having front and rear end cover or closure members 2, 3 which are secured in position by cover screws 4.

Figure 5:
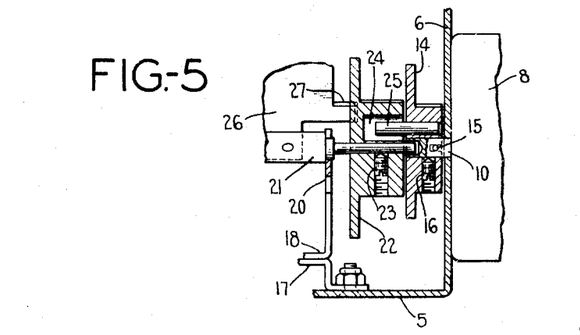
Fig. 5 is a detail view in section on the line 5—5 of Fig. 3.

Within the casing there is an L-shaped supporting member having a bottom flange 5 which seats on the bottom casing wall and has an upstanding front flange 6 which is spaced from and rigidly secured by brackets 7 to the front cover member 2. Positioned between the flange 6 and cover member 2 and secured to the flange 6 by screws 9, there is a hand wound spring driven timing motor 8 which may be of the type known on the market as the Minute Minder, manufactured by the Lux Clock Company, New Haven, Connecticut and which has a combined winding and drive shaft 10 extending from the opposite walls or faces of the clock or timer motor casing. The front end portion of shaft 10 which projects through the cover member 2 has secured thereon a winding key and stop member 11 cooperable with posts or stop pins 12, 13 to limit the rotation of the shaft 10 and unwinding and winding respectively of the clock spring. The inner end of the shaft 10, see Fig. 5, which projects through the flange 6 carries a cam disc or member 14 to which the shaft is connected for positive driving action by a pin and slot connection 15. A set screw 16 engaging the shaft 10 and threaded in the hub of the member 14 locks the same against endwise movement on the shaft 10.

Figure 1:
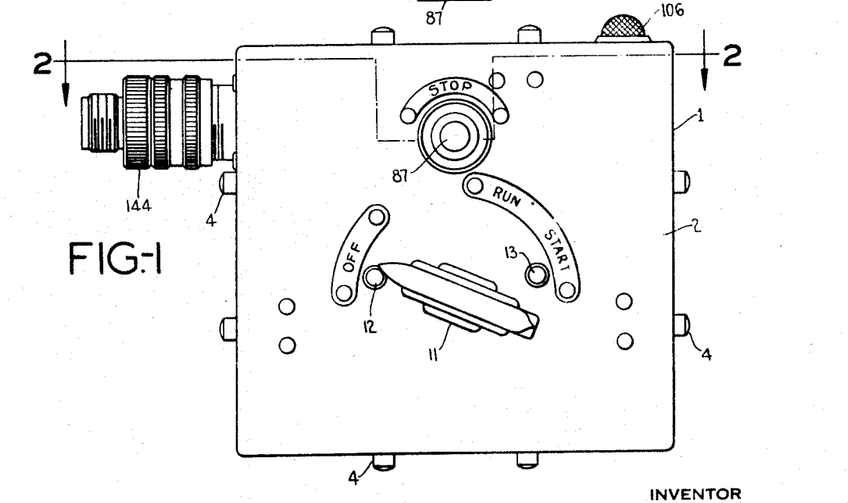
Figure 1 is a view in front elevation of a control mechanism casing.
Figure 2:
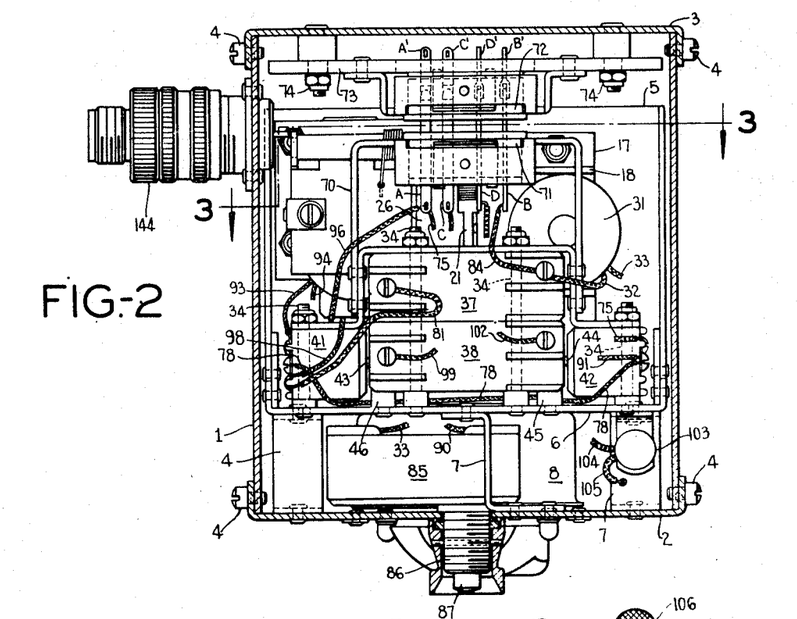
Fig. 2 is a top plan view of the encased mechanism with lead wires broken away for clarity and taken through the casing wall substantially on the line 2—2 of Fig. 1.
Figure 3:
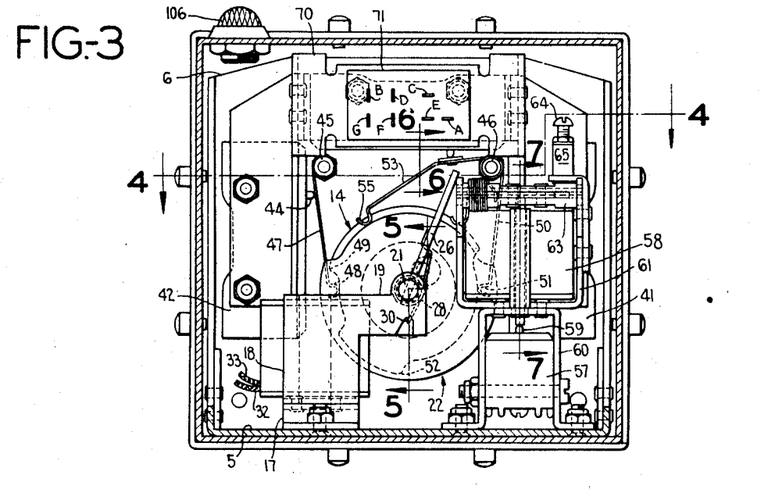
Fig. 3 is a view in end elevation of the encased mechanism with lead wires broken away for clarity taken on the line 3—3 of Fig. 2.

Secured on the bottom flange 5, there is a base member 17 on which is mounted a U-shaped bracket member 18 having upstanding parallel sides terminating in lateral extending arms 19 and 20 which are apertured to provide aligned bearings co-axial with the shaft 10. Journalled in the arm apertures and extending between the arms 19, 20 there is an armature supporting shaft 21 which is held against endwise movement by outward facing shoulders bearing against the arms. The shaft 21 projects through the arm 20 and may extend into a recess in the inner end of the shaft 10. Secured on the projecting end portion of the shaft 21 there is a cam disc or member 22 held in position by a set screw 23 threaded in the disc hub and locked against the shaft 21. The hub of disc 22 has a slot or recess 24 facing the disc 14 and receiving the projecting end of a pin 25 which extends from and is fixed in an aperture in the disc 14. The slot 24 is preferably a cylindrical bore having a diameter sufficiently greater than the diameter of the pin 25 as to provide a lost motion connection between the shafts 10 and 21 for relative movement therebetween. The extent of lost motion is preferably substantially 30° of shaft rotation. Rigidly secured to the shaft 21 and extending longitudinally thereof, there is a substantially rectangular magnetic plate member or armature 26 which has an ear or flange 27 extending into and fitting within a slot in the face of cam disc 22, so that the armature and cam disc are positively locked together. Surrounding the shaft 21 adjacent the arm 19, there is a helical coil spring 28 having one end anchored, as at 29, to the armature 26 and having its other end secured to the arm 19, as at 30, such that the spring 28 tends to rotate the shaft 21 in a clockwise direction facing Fig. 3. Positioned between the sides of and secured to the face of the bracket 18 there is an electro-magnet 31 having lead wires 32, 33 cooperable with the armature 26 to provide a means for holding the cam disc 22 against rotation. The armature 26 overlies the arms 19 and 20 and is limited thereby from engagement with the core of the electro-magnet 31, so that an air gap of say twenty-five thousandths of an inch will be maintained.

Figure 6:
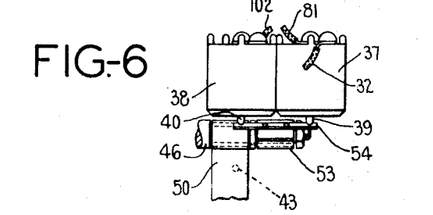
Fig. 6 is a detail view taken on the line 6—6 of Fig. 3.
Figure 8:
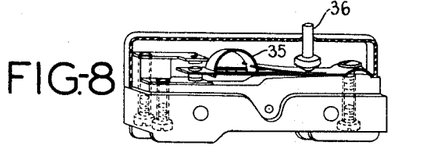
Fig. 8 is an enlarged perspective view of one of the switches forming part of the control system.

Secured to the inside face of the supporting member flange 6 there are a plurality of switch units, each comprising a housing of electric insulating material secured on studs 34 projecting from the flange 6. These switch units are of the single pole, double throw type actuated by a snap acting spring mechanism 35, operated by a thrust member 36 which projects through an aperture in the housing cover member. Further description of these switches is believed unnecessary as they may be obtained on the market, the type known as the Acro snap switch, manufactured by the Acro Switch Company, Cleveland, being preferable. Two of these switch units, designated 37, 38, overlie the cam discs 14, 22 and have their thrust members 39, 40 respectively projecting downward, see Fig. 6. Positioned at opposite sides of the cam disc 14 there are switch units 41, 42 having thrust members 43, 44 respectively. Also projecting from the rear face of the flange 6 there are rods or shafts 45, 46 positioned above and at the sides of the cam disc 14 and adjacent the underside of the switch units 37, 38. Journalled on the post 45 there is a cam follower lever member 47 extending downward for abutting engagement intermediate its ends with the thrust member 44 and having its free end rebent as at 48 to provide a cam follower portion engaged with the circumferential face of the cam disc 14. The follower member 47 is swung or moved to the left facing Fig. 3 to operate to closed position the switch of unit 42 by a cam or lobe 49 on the cam disc 14.

Figure 4:
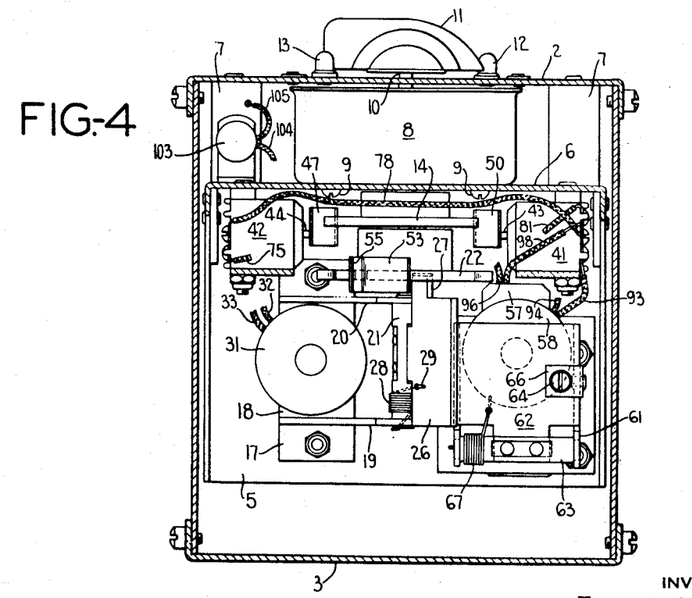
Fig. 4 is a plan view in section of the encased mechanism with lead wires broken away for clarity taken on the line 4—4 of Fig. 3.

On the rod 46 there is journalled a cam follower lever member 50 engageable intermediate its ends with the switch operating thrust member 43 and terminating at its free end in a follower portion 51 engaged with the circumferential face of the cam disc 14. The follower portion 51 operates with a cam or lobe 52 for actuating the double throw switch member of unit 41 by depressing its thrust member 43. Also journalled on the rod 46 there is a cam follower lever member 53 having a transverse extension 54 engageable with the thrust member 39, 40 and having its free end terminating in a follower portion 55, riding on the circumferential face of the cam disc 22. The follower portion 55 is cooperable with a cam or lobe 56 on the disc 22 so that the follower member actuates the thrust members 39, 41 to operate the switches of units 37, 38. The cam or lobe 49 extends, facing Figs. 4 and 11, a distance more than 120° and the cam or lobe 52 is spaced from the follower member portion 51 substantially 90°, the cam 52 extending clockwise facing Figs. 4 and 11, a distance greater than 30°. The cam or lobe 56 is positioned substantially 120° in a clockwise direction from the cam or lob 49.

Figure 7:
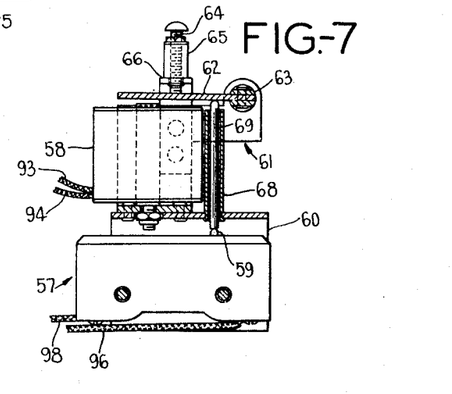
Fig. 7 is a detail view of a relay switch and taken on the line 7—7 of Fig. 3.

Positioned on the opposite side of the shaft 21 from the electro-magnet 31 there is a relay switch 57 having a magnetic operating coil 58. The switch 57, see Fig. 7, is a unit such as shown in Fig. 8 having an operating thrust member 59 and rigidly clamped in position between the sides of an inverted U-shaped bracket 60. The coil 58 is secured to the base or bottom wall of a U-shaped bracket 61 and is positioned between the sides thereof, the base being secured by rivets or the like to the base of the bracket 60. Positioned in overlying relation to the sides of bracket 61 for engagement therewith to limit its movement, there is a magnetic plate member or armature 62 for attraction by the coil 58. The bracket sides maintain an air gap of say twenty-five thousandths of an inch between the armature 62 and the magnet core. The armature 62 is secured to a shaft 63 which extends between and is journalled in aligned apertures in the sides of the bracket 61. Supported by one of the bracket sides there is an adjustable stop member 64, such as a screw threaded through a sleeve 65, carried by an arm 66 which overlies the armature 62. The screw 64 is engaged by the armature 62 to limit the upward movement of the armature by a helical coil spring 67 which surrounds the armature shaft 63 and has one end anchored to the armature and the other end secured to the bracket 61. Supported by the base of the bracket 60, there is a tubular guide member 68 which is aligned with the thrust member 59 and which extends upward to a point adjacent the underside of the armature 62. Positioned within and guided for reciprocation by the member 68, there is a push rod 69 which seats on the thrust member 59 and which, at its upper end, abuts the armature 62 so that the switch 57 will be actuated when the coil 58 is energized.

Clamped in position by the studs 34 and extending horizontally above the shaft 21 there is a supporting bracket 70 which carries a terminal block or jacket 71 having contact fingers electrically engageable with matching sockets in a terminal block or receptacle 72 carried by a mounting panel 73 of electric insulating material. The panel 73 is mounted on studs 74 secured to the inside face of the casing cover member 3. The jacket terminal A is connected by a lead wire 75 to the fixed contact 76 of the switch 42 which has the contact of its switch blade 77 connected by a lead wire 78 to the switch blade 79 of the double throw switch 41. The switch contact 80, normally closed by the contact of blade 79, is connected by a lead wire 81 to the switch blade 82 of switch 37. A contact of switch blade 82 is cooperable with a fixed switch contact 83, connected to the lead wire 32 of the coil 31. The lead wire 32 is connected by a lead wire 84 to the jacket terminal B. Secured to the inside face of the front cover member 2 above the timing motor 8, there is a manually operable normally closed switch 85 which is a unit such as shown in Fig. 8. The housing for switch 85 is carried by a guide and supporting sleeve 86 secured in an aperture in the member 2 and aligned with the switch blade operating thrust member. Supported and reciprocable in the sleeve 86 there is a thrust member operating push button 87. The fixed contact 88 of the switch 85 is connected to the holding coil 31 by the lead wire 33. The contact of switch blade 89 of switch 85 is connected by a lead wire 90 to the jacket terminal C. The switch 42 has its blade 77 and lead wire 78 connected by a lead wire 91 to the jacket terminal D. The normally open fixed contact 92 of the switch 41 is connected by a lead wire 93 to the relay coil 58. From the other terminal of the coil 58 a lead wire 94 connects to the jacket terminal E. The relay switch arm 95 is connected by lead wire 96 to the jacket terminal A and the fixed relay contact 97 is connected by lead wire 98 to the lead wire 81 and switch arm 82 of the switch 37. The switch 38 has its switch arm 99 connected by a lead wire 100 to the jacket terminal F. The fixed contact 101 of switch 38 is connected by a lead wire 102 to the jacket terminal G. A pilot light indicator 103 has one terminal connected by a lead wire 104 to the fixed switch contact 101 and lead wire 102, the other pilot light terminal being connected to ground by a lead wire 105. A translucent ruby lens 106 is supported in the casing wall above pilot light 103 to indicate from the exterior of the casing that the light is burning. The connectors or terminals of the socket terminal block 72 are connected to the source of current supply and to the heating apparatus.

The fuselage or cabin of the aircraft which is to be heated by the heating apparatus is designated 107. The heating apparatus has a furnace 108 with a combustion chamber 109 having an outlet stack or discharge duct 109ᵃ leading to the exterior of the aircraft. Surrounding the combustion chamber 109 there is an air heating jacket or plenum chamber 110 which is supplied with air to be heated from the exterior of the aircraft through an inlet conduit 111. The chamber 110 has a discharge conduit 112 for the heated air and which may lead to one or more desired discharge points. Within the combustion chamber 109 there is a liquid fuel capillary feeding member 113 which is supplied with liquid fuel from a constant level device 114. A constant displacement pump 115 feeds the device 114 through a conduit 116 and draws liquid fuel from a supply tank 117. The pump 115 is driven by an electric motor 118 having one terminal connected to ground by a lead wire 119 and having its other terminal connected by a lead wire 120 to one terminal of a pressure responsive safety switch 121 which acts to open the switch 120 upon the occurrence of excess liquid pressure in the conduit 116. From the other terminal of the safety switch a lead wire 122 connects through a low motor speed resistor 123 to the socket terminal B' for connection to the jacket terminal B. There are two parallel resistor circuits, one having a low motor speed resistor 123 connected by a lead wire 124 to the socket terminal B' which connects to the jacket terminal B. The other parallel circuit has a high motor speed resistor 125 connected by a lead wire 126 to the socket terminal G' connected to the jacket terminal G. In the combustion chamber 109 and cooperative with the fuel feed member 113, there is a hot wire igniter 127 for generating an igniting temperature in excess of 1200° F. The igniting means 127 is connected to ground by a lead wire 128 and has its other end connected by a lead wire 129 to the socket terminal E' connected to the jacket terminal E. An air temperature safety switch 130 has a temperature responsive member 131 in heat exchange relation with the jacket 110 and operable to open the safety switch at a temperature of say 170° F. The switch 130 is connected by a lead wire 132 to the socket terminal C' connected to the jacket terminal C. The combustion chamber 109 is supplied with combustion supporting air through a duct 133 which is fed with air under pressure by a blower 134 driven by an electric motor 135 or is supplied with air under pressure from an air ram 136 comprising a branch duct leading to the exterior of the airplane. The blower motor 135 has one terminal connected to ground by a lead wire 137 and has its other terminal connected by a lead wire 138 to one fixed terminal 139 of a double throw air pressure responsive switch 140 which is responsive to the air pressure in the duct 133. The air pressure responsive switch arm 141 is connected by a lead wire 142 to the socket terminal D' connected to the jacket terminal D. The normally open fixed contact 143 of the air pressure responsive switch is connected by a lead wire 144 to the socket terminal F' connected to the jacket terminal F. The foregoing circuits are energized from a source of electric current supply such as a battery 145 preferably having a potential of 24 v. and which has its negative terminal connected to ground by a lead wire 146 and has its positive terminal connected by lead wire 147 to the socket terminal A' connected to the jacket terminal A. The lead wires 84, 100, 102, 124, 126, 129, 132 and 142 extend into the casing 1 through a tubular conduit member 148 secured in an aperture through the side wall of a casing.

Figure 9:
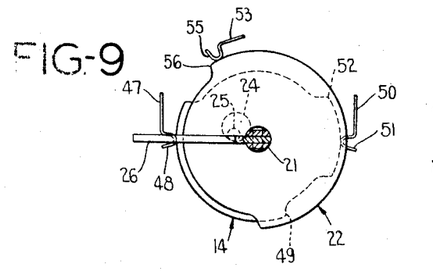
Fig. 9 is a detail view showing certain switch operating members in burner starting position.
Figure 10:
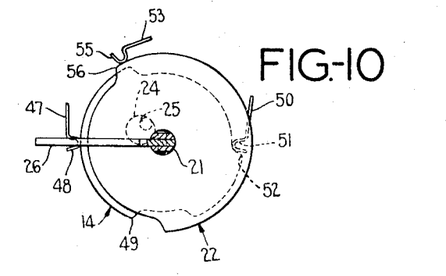
Fig. 10 is a view similar to Fig. 9 but showing the parts at termination of burner ignition.

The operation of the control device and heating apparatus of Figs. 1 to 11 is as follows. When it is desired to start the heating apparatus to supply heat to the enclosed aircraft space, the winding knob or key 11 is rotated clockwise facing Fig. 1 and counter-clockwise facing Figs. 3, 9 and 10 to the start position at which it engages the stop pin 13. This rotation of the member 11 winds the spring of timer motor 8 for substantially a twenty minute running period and simultaneously rotates the drive shaft 10 and the armature supporting shaft 21 and their respective cams to set position for burner starting operation. Rotation of shaft 10 first engages cam 49 with follower member 47 to close the main switch 42 and then, upon 90° of continued rotation which covers a 15 minute timer motor running period, engages cam 52 with follower member 50 to actuate the double throw switch 41 to open the circuit at contact 80 and to close the circuit between blade 79 and contact 92. At the time of closure of switch 42, the lost motion connection by pin 25 and slot 24 has been taken up so that the cam discs 14 and 22 will have simultaneous equal rotation. Winding of the shaft 10 continues from the point at which follower member 50 drops off of cam 52 for a distance of 30°, which is a five minute running interval or period of the motor 8. This additional 30° winding movement of shaft 10 acts to move the cam 56 under the follower member 53, thereby closing the switches 37, 38 and carries or rotates the holding means armature 26 against the force of spring 28 into holding relation to the electro-magnet 31. The cams and their switch operating follower members and the armature 26 will now be positioned as shown in Fig. 9. Current from the battery 145 will now be supplied through panel terminal members A', A and lead wire 75 to the main switch fixed contact 76, thence through switch blade 77 and lead wires 78, 91 to panel terminal members D, D', thence via lead wire 142 to the switch arm 141 and closed contact 139 of the air pressure or ram switch 140, thence via lead wire 138 to one terminal of the blower motor 135 and thence to ground via lead wire 137. The blower 134 is thus placed in operation to supply combustion air through duct 133 to the combustion chamber 109. Closure of switch 42 also closed the circuit to switch arm 79 of the double throw switch 41 so that circuit is completed from the switch arm to the now closed, but normally open, contact 92 to the relay coil 58 via lead wire 93, thence via lead wire 94 to the panel terminals E, E' and via lead wire 129 to the hot wire igniter 127 and thence to ground via lead wire 128. The igniter 127 is therefore energized but closure of the relay switch 57 to supply fuel is dependent upon a sufficient amperage of the current supply, such as to raise the temperature of the igniter 127 above a minimum desired igniting temperature, as above noted. The relay switch 57 will therefore also not be closed if there is a break in the igniter circuit or if the operating amperage for relay coil 58 and igniter 127 is not provided. The closure of switch 57 establishes a circuit from the battery 145 in shunt with the switch 42 and now open, but normally closed, contact 80 of switch 41. This shunt circuit leads from the battery 145 through lead wire 147 to panel terminals A', A, thence to relay switch arm 95 via lead wire 96 and from relay switch contact 97 via lead wire 98 to the lead wire 81 and switch arm 82 of switch 37. Cam 56 has closed the switch 37 and the circuit will continue through lead wire 32 to the coil of holding magnet 31 and thence via lead wire 33 to the fixed contact 88 of the burner stopping switch 85 and thence from the burner stopping switch contact 89 via lead wire 90 to panel terminals C, C' and thence to the bonnet temperature safety switch 130 and to ground. Closure of relay switch 57 also completes the circuit through the low motor speed switch 37 via lead wire 84 (in Fig. 11 lead wires 32 and 84) to panel terminals B, B', thence via lead wire 124 through low motor speed resistor 123 and lead wire 122 to the closed fuel pressure safety switch 121 and thence via lead wire 120 to one terminal of the pump motor 118 and thence to ground via lead wire 119. Fuel and combustion air being supplied and the igniter 127 being at igniting temperature, the heating apparatus will be in operation and the timing motor 8, the winding key 11 having been released, will also be operating or running to rotate the shaft 10 counterclockwise facing Fig. 1 and clockwise facing Figs. 3, 9 and 10. When the ignition period has elapsed, preferably of five minutes duration, the cam 52 will have released follower member 50 so that arm 79 of switch 41 will move back to initial position, closing the circuit of contact 80 and opening the circuit of contact 92. The switch 41, as are the other switches, being snap acting, the interchange of circuits from contact 92 to contact 80 will not interfere with burner operation. Breaking of circuit at contact 92 will deenergize the relay coil 58 and the igniter 127, thereby opening the relay switch 57, but the closure of arm 79 with contact 80 will maintain the continued operation of the pump 118, since the contact 80 and the relay switch 57 are in shunt circuit. As long as combustion air pressure in the supply duct 133 and therefore in the branch duct 136 is below the pressure for which the ram switch 140 is set, the heating apparatus will continue in operation at low fuel consumption due to low speed pump motor operation which is sufficient to supply fuel in accordance with the air supplied by the blower 134.

When the quantity of air supplied to the combustion chamber through duct 133 exceeds the quantity for a proper fuel air ratio, the increased pressure of the combustion air in the duct 133 and branch duct 136 will actuate the ram switch 140 to make circuit between the arm 141 and the contact 143. This increased air pressure for actuating the switch 140 will result from the speed of the aircraft in flight. Closure of the circuit between arm 141 and contact 143 will break the blower motor circuit at switch contact 139 and will complete the high speed fuel pump motor circuit as follows: From contact 143 via lead wire 144 to the panel terminals F', F, thence via lead wire 100 to switch arm 99 of switch 38 and its engaged contact 101, thence via lead wire 102 to the panel terminals G, G' to lead wire 126 and through the high motor speed resistor 125, lead wire 122 and closed fuel pressure switch 121 to the motor 118 via lead wire 120. Closure of contact between arm 141 and contact 143 will also complete the circuit through closed switch 38 to the indicator pilot light 103, connected by lead wire 104 to contact 101 and lead wire 102 and connected to ground by lead wire 105. As long as the aircraft continues in flight and the air pressure in ducts 133 and 136 is greater than the pressure created by the blower 134, the heating apparatus will continue to operate at high fuel supply.

Irrespective of whether burner is operating at high or low fuel consumption, the operation of the heating apparatus can be stopped by the manual switch 85. When the push button 87 of this switch is moved inward, the switch 85 will be opened by movement of arm 89 out of engagement with contact 88, which will break the circuit through the holding magnet coil 31. Deenergization of coil 31 will permit the spring 28 to move the armature 26 quickly to the position of Figs. 3 and 11, due to the lost motion of pin 35 in slot 24. Cam 56 will move with initial movement of armature 26 and out from under follower member 53 so that the switches 37 and 38 will be opened, which will break both the low speed and the high speed fuel pump motor circuits. The release of the armature 26 will reinstate and release for continued operation the timing motor 8. Cam disc 14 will now again be rotated clockwise facing Figs. 3, 9 and 11 from its position in Fig. 10. The 90° of cam movement from the position of Fig. 10 occupies a time period of 15 minutes and when this time period or interval has elapsed, the cam 49 will move out from under the follower member 47 so that the switch arm 77 of switch 42 will break circuit with the contact member 76, thereby breaking the circuit to the ram switch arm 141. If the aircraft is on the ground or its air speed has decreased, so that the ram switch 140 breaks circuit at contact 143 and makes circuit at contact 139 at the time when the burner stopping button 87 is actuated, then the blower motor 135 will be maintained in operation during the time interval prior to movement of cam 49 from under the follower member 47 and consequent opening of switch 42. Accordingly, there will be at least a predetermined period of supply of scavenging air to the combustion chamber 109 immediately following the stopping of the fuel pump 115. It will be apparent that if the pump 115 is stopped during flight by operation of switch 85, that scavenging air will be supplied by the speed of the aircraft through branch duct 136 and the blower motor 135 will not be placed in operation, but if the pressure of the combustion air decreases below the pressure supplied by blower 134 prior to or after landing of the aircraft and within the 15 minute interval, then the blower 134 will immediately be placed in operation to continue the supply of scavenging air. Should the temperature of the air jacket or plenum chamber exceed the desired safety limit of 170° F., the safety switch 130 will be opened, thereby breaking the circuit of the holding coil 131, thereby stopping the burner and establishing the scavenging period in the same manner as opening the switch 85 with which the switch 130 is in series circuit.

Figure 11:
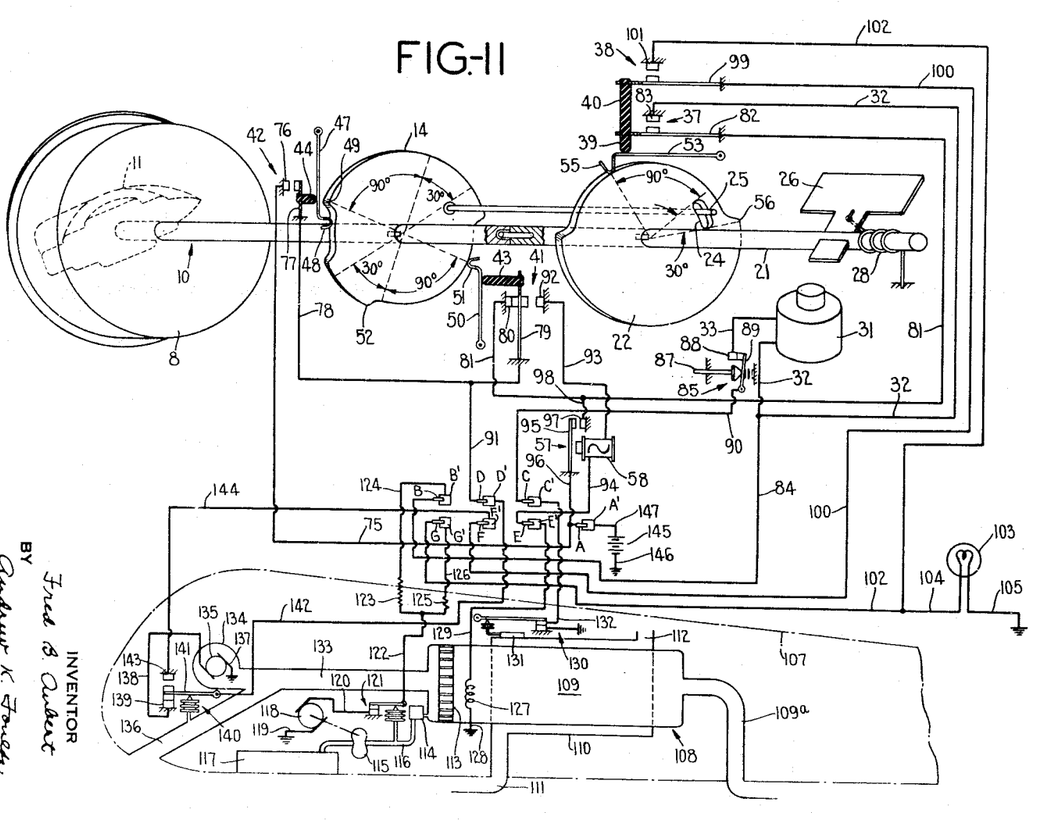
Fig. 11 is a diagrammatic view of the heating apparatus and control system as applied to the heating of aircraft.
Figures 12, 13:
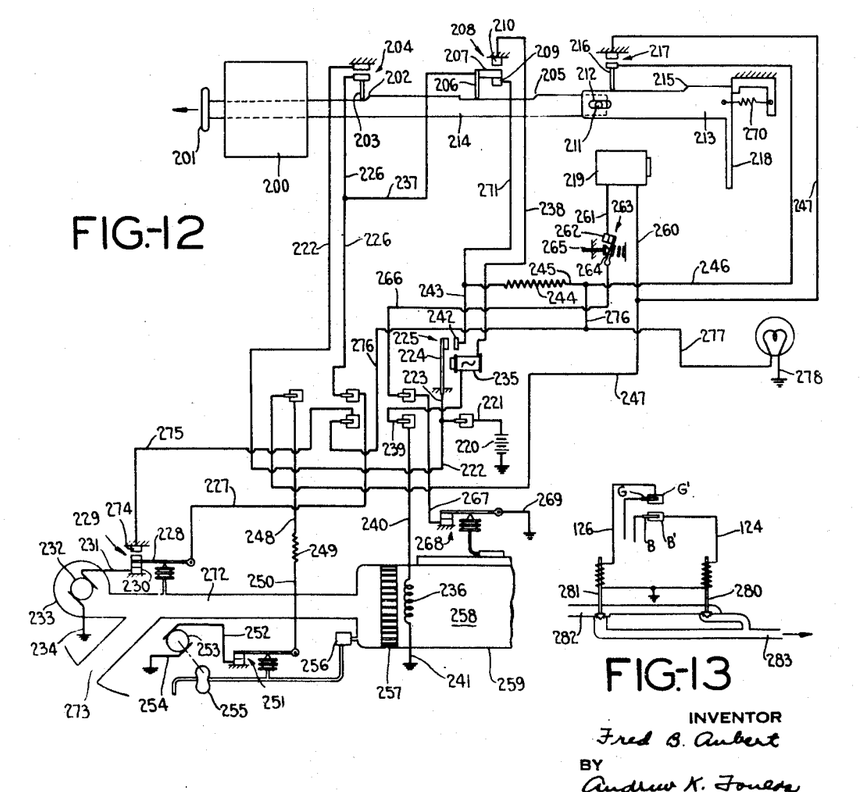
Fig. 12 is a diagrammatic view similar to Fig. 11 but showing another form of control mechanism.
Fig. 13 is a detail diagrammatic view of another form of fuel flow controlling means.

Referring to Fig. 12, a different form of cam and holding means armature and a different circuit arrangement for the fuel pump motor is shown. The operation of this control system and apparatus will be apparent from the above description, taken in connection with the following. When the timing means motor 200 is set or wound by operation of the key or knob 201, the cam 202 will engage the switch operating follower member 203 to close the main switch 204. Upon continued winding of the motor, the cam 205 will engage the switch operating follower member 206 to actuate the switch arm 207 of the double throw switch 208, thereby breaking circuit at the inlet closed contact 209 and making circuit at the normally open contact 210. Simultaneously with the engagement of cam 202 with follower member 203, the lost motion pin 211 will engage the end of the lost motion slot 212 to initiate movement of the cam member 213. When the cam member 214 carrying cams 202 and 205 has been moved sufficiently to carry the cam 202 a distance equal to say twenty minutes of timing motor running time beyond or to the left of follower member 203, the cam 215 of member 213 will engage and move under the cam follower 216, thereby to close the switch 217. Simultaneously with closure of switch 217, the holding means armature 218 carried by the cam member 213 will be moved into magnetic holding relation relative to the electro-magnet 219. Closure of the main switch 204 will complete a circuit from the battery or current supply source 220 via lead wire 221 to the lead wires 222, 223 leading respectively to the fixed contact of switch 204 and to the switch arm 224 of the relay switch 225. From the closed switch 204 a lead wire 226 connects through the panel terminals to a lead wire 227 connected to the switch arm 228 of combustion air pressure responsive or ram switch 229 and thence through the normally closed contact 230 via lead wire 231 to the motor 232 of the combustion air blower 233 and to ground via lead wire 234. Closure of main switch 204 also completes the circuit to the coil 235 of relay switch 225 and to the hot wire igniting means 236 as follows: From main switch lead wire 226 via lead wire 237 to switch arm 207 in contact with a now closed but normally opened contact 210, thence via lead wire 238 to one terminal of the coil 235, thence via lead wire 239 to panel terminals and via lead wire 240 to one terminal of the ignition wire 236, and from the other ignition terminal via lead wire 241 to ground. The relay switch 225 is in shunt circuit with the now open, but normally closed, switch contact 209 and closure of relay switch 225 by energization of its coil 235 completes a circuit from the battery 220 through relay arm 224, to relay contact 242, thence via lead wire 243 to low motor speed resistor 244 connected in lead wire 245, which is connected to lead wire 246, leading to one terminal of the cam operated switch 217. From the other terminal of switch 217, the lead wire 247 connects to panel terminals from which lead wire 248 connects to one terminal of the high motor speed resistor 249 having its other terminal connected by lead wire 250 to the switch arm of the fuel pressure responsive safety switch 251 from which a lead wire 252 connects to one terminal of the fuel pump motor 253 having its other terminal connected to ground by lead wire 254. The resistors 244 and 249 are in series circuit to provide low speed motor operation for a low rate of fuel supply by the fuel pump 255 to the constant level valve 256 which supplies the capillary oil feeding means 257 in the combustion chamber 258 of the heating apparatus 259. Connected to the lead wire 247 from switch 217 there is a lead wire 260 connected to one terminal of the electro-magnet 219 from the other terminal of which extends a lead wire 261 to the contact 262 of the burner stopping switch 263, having its switch arm 264 operable by the push button 265. From the arm 264 a lead wire 266 connects to the panel terminals and a lead wire 267 connects to the fixed contact of the bonnet temperature responsive safety switch 268 having its temperature actuated arm connected to ground by lead wire 269. From the foregoing, it will be apparent that the heating apparatus is now in operation, the knob 201 having been released, fuel being supplied by the pump 255 and combustion air by the blower 233, the combustible mixture being ignited by the hot wire igniter 236, assuming, of course, that the proper amperage was supplied to the relay coil 235 as above described with Figs. 1 to 11. When the timing means 200 has run for the desired ignition period of five minutes, then the cam 205 will move out from under the follower member 206, so that the switch 208 will be actuated to break circuit at contact 210 and to make contact at 209, the cam member 213 being held by electro-magnet 219 against the force of the return spring 270 in position with cam 215 holding the switch 217 closed by reason of the permitted lost motion between pin 211 and slot 212. Closure of switch 209 establishes a circuit from the battery 220 in shunt with the relay switch 225, via a lead wire 271 which connects the contact 209 to the lead wire 245 of the resistor 244. When the cam 205 moves out from under the follower member 206 the end wall of the lost motion slot 212 will be engaged by pin 211, thereby stopping further running of the timing means motor 200, and the burner will continue in operation at low fuel consumption as long as the pressure in air supply duct 272 does not exceed the air pressure provided by the blower 233. Breaking of circuit of contact 210 deenergizes the relay coil 235 and the hot wire igniter 236. When the aircraft supplied by the heating apparatus 259 is in flight, so that the pressure of the air supplied to duct 272 through the branch duct 273, opening to the exterior of the aircraft, exceeds the pressure provided by the blower 233, then the ram switch 229 will be actuated to break circuit at the contact 230 and to make contact at the normally opened contact 274 so that current will flow from the switch arm 228 through lead wire 275 to the panel terminals and thence via lead wire 276 to the lead wire 246 and cam actuated switch 217 which controls the fuel pump motor 253. Closure of this circuit at contact 274 short circuits the low speed resistor 244 so that the speed of motor 253 will be increased to provide the necessary increased supply of fuel to compensate for the increased air supply due to the higher air pressure in the combustion chamber supply duct 272. Closure of the circuit at ram switch contact 274 also completes the circuit from lead wire 276 through lead wire 277 to the pilot light indicators 278, which is connected to ground. As in connection with Figs. 1 to 11, discontinuance of burner operation is effected by depressing the push button 265 which opens the burner stopping switch 263, thereby deenergizing the holding magnet 219 so that the spring 270 retracts the cam 215 from its position holding switch 217 closed and also moves the end wall of slot 212 out of holding relation to the pin 211 so that the timing motor 200 is permitted to continue its operation of returning cam 202 to the position shown in Fig. 12. This time period of reinstated operation of the motor 200 extends over a 15 minute period prior to movement of cam 202 out of holding relation to minimum switch 204, so that during this time period the blower motor 232 will be energized to supply scavenging air to the combustion chamber 258 as the pressure in the duct 272 is below the pressure provided by the blower 233, all as above described in connection with Figs. 1 to 11.

In Fig. 13 there is shown a modification of the fuel supplying means of Figs. 11 and 12. In this Fig. 13 the control of the fuel supply is by means of electrically operated or solenoid valves 280, 281 controlling flow from a manifold or conduit 282 to a pipe or conduit 283 which feeds the fuel distributing means in the combustion chamber. The valve 280 may be connected to the lead wire 124 of Fig. 11 leading from socket terminal B' connected to jacket terminal B and controlled by switch 37. The valve 281 may be connected to return wire 126, connected to socket terminal G', which is connected to jacket terminal G having its circuit controlled by cam switch 38 and the air pressure responsive switch 140. Thus, for blower air supply to the combustion chamber the fuel will be fed through valve 280 alone and for flight or high combustion air pressure fuel will be supplied through both of the valves 280 and 281.

Figure 14:
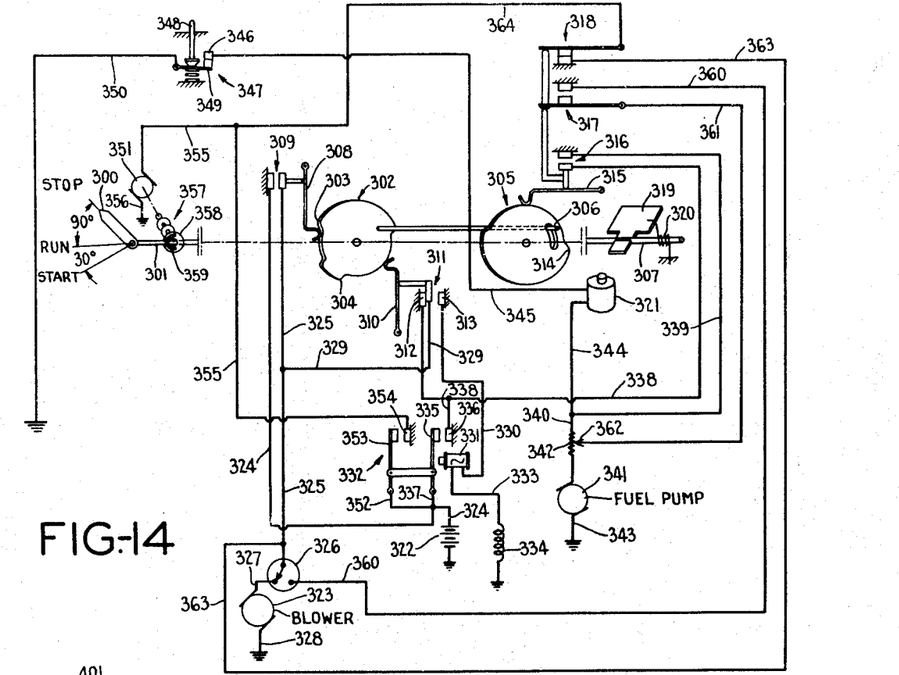
Fig. 14 is a view of the control mechanism and apparatus as in Fig. 1 but having an electric drive for the control mechanism.

In Fig. 14, the timing motor is electrical and the control device and system is constructed and arranged substantially as above. When it is desired to start the heating apparatus in operation, the control arm 300 is rotated through 120° to the start position, which rotates shaft 301 having fixed thereon a cam disc or member 302 with a main switch operating cam 303 and a relay and igniter controlling cam 304. The cam member 302 is coupled to a cam disc or member 305 by a lost motion pin and slot connection 306, such that the shaft 301 is movable relative to the shaft 307 to which the member 305 is fixed. Rotation of shaft 301 to the start position first moves cam 303 into operative engagement with the follower member 308 to close the main switch 309. Upon rotation of cam member 302 through substantially 90° from the point of operation of switch 309, the cam 304 engages follower member 310 to actuate the double throw switch 311 to break contact at the normally closed contact 312 and to make contact at the normally open contact 313 at the time of closure of switch 309. The lost motion between cam members 302 and 305 is taken up so that the member 305 is rotated with the member 302 and so that upon substantially 30° of shaft rotation upon operation of follower member 310, the cam 314 of cam member 305 engages its follower member 315 to close the low speed fuel pump switch 316, the high speed fuel pump switch 317 and to open the timing motor switch 318. As in the device of Figs. 1 to 11, the rotation of shaft 307 also rotates the holding means armature 319 against the force of its return spring 320, so that the armature 319 is positioned in holding relation to its electromagnet 321 upon operation of follower member 315 by cam 314. Rotation of the starting lever 300 to the start position closes the circuit from the battery or source of current supply 322 to the combustion air blower motor 323, the circuit being from the battery 322 (which is connected to ground) through lead wire 324 to the fixed contact of main switch 309 and from the movable switch contact via lead wire 325, through the normally closed contacts of the combustion air pressure responsive or ram switch 326 and lead wire 327 to one terminal of the blower motor 323 and from the other blower motor terminal via lead wire 328 to ground. Closure of switch 309 also closes circuit from lead wire 325 via lead wire 329 to the movable contact or switch arm of the double throw switch 311 engaging the now closed, but normally opened, fixed contact 313, thence via lead wire 330 to one terminal of the coil 331 of relay switch 332 and from the other coil terminal via lead wire 333 to one terminal of the hot water igniter 334 having its other terminal connected to ground. Energization of relay coil 331 actuates the relay switch arm 335 to engage the fixed relay contact 336, thereby completing a circuit in shunt with the main switch 309 and the normally closed contact 312 of switch 311. This shunt circuit leads from the battery lead wire 324 via lead wire 337 to the switch arm 335 and thence through contact 336 and lead wire 338 to the movable contact of low speed switch 316 and thence via lead wire 339 to lead wire 340 which is connected to one terminal of the fuel pump motor 341 and contains a variable resistance 342. The other terminal of the fuel pump motor is connected to ground by a lead wire 343. From the lead wire 339 a lead wire 344 connects to one terminal of the coil magnet 321 which has its other terminal connected by a lead wire 345 to the fixed contact 346 of the manual burner stopping switch 347, having an operating rod or push button 348. The switch arm 349 of the switch 347 which is operated by the button 348 is connected by a lead wire 350 to ground. The relay switch 332 also controls the electric timing motor 351, the circuit being as follows. From the battery lead wire 324 via lead wire 352 to relay switch arm 353 engaged with switch contact 354 and thence via lead wire 355 to one terminal of the motor 351 and from the other motor terminal via lead wire 356 to ground. The motor 351 is connected through a reduction gear train 357 to a clutch member 358 cooperable with a friction spring clutch member 359 rigid with the shaft 301. Assuming that the igniter 334 is properly energized as described above in connection with the foregoing systems, the burner will be in operation at low fuel supply and will be supplying heated air to the desired supply points and the timer motor 351 will be rotating the cam member 302 toward igniter stopping position, the cam member 305 being held against rotation by the armature 319 and its holding magnet 321.

This low fuel supply operation of the burner will continue as long as the combustion air pressure is not in excess of the pressure supplied by the blower 323. When the combustion air pressure exceeds that supplied by the blower 323, such as will result from the aircraft in flight, then the ram switch 326 will be actuated to break contact between lead wires 325 and 327 and to make contact between lead wire 325 and lead wire 360 leading to the high speed fuel motor switch 317, which is held closed by the cam 314. From the closed switch 317 current will flow through the lead wire 361 to the adjustable contact 362 of the resistor 342, thereby shunting out a part of the resistor 342 and reducing the resistance in the fuel pump motor circuit which will result in increasing the speed of the fuel pump and accordingly the supply of fuel to the burner. As long as the increased air pressure continues, the increased supply of fuel will continue. When the combustion air pressure decreases to the pressure created by the blower 323, then the ram switch 326 will again place the blower 323 in operation by closure of contact between lead wires 325 and 327, which will also break the circuit through switch 317 so that the fuel pump motor will again be operated at low speed. When it is desired to stop further operation of the burner, irrespective of whether the aircraft is in flight or on the ground, that is, irrespective of the ram switch 326, the manual stopping switch 347 is actuated by the push button 348 which will break the circuit through the holding magnet 321. Release of the armature 319 by the deenergization of magnet 321 will permit spring 320 to rotate cam 314 from its holding relation to follower member 315 due to the lost motion pin and slot connection 306. Release of the follower member 315 will result in the opening of switches 316 and 317, thereby deenergizing the fuel pump motor 341 and will close switch 318, thereby completing a shunt circuit to the timing motor 351 as follows:

From the ram switch lead wire 325 through lead wire 363 to the fixed contact of switch 318 and thence through the switch arm via lead wire 364 to the lead wire 355, connected to the timing motor 351. This will reinstate operation of the motor 351, thereby reestablishing rotation of cam member 302 to provide a predetermined time period prior to opening of main switch 309 controlling the blower 323. When the motor 351 has operated through a period of say 15 minutes for scavenging of the combustion chamber, either by operation of blower 323 or by the increased pressure of flight created combustion air, then the cam 303 will move out of holding engagement with follower member 308 and switch 309 will be opened. The opening of switch 309 breaks the circuit through switch 318, thereby deenergizing and stopping the timing motor 351 in the stop position of operating or setting knob or handle 300.

Figure 15:
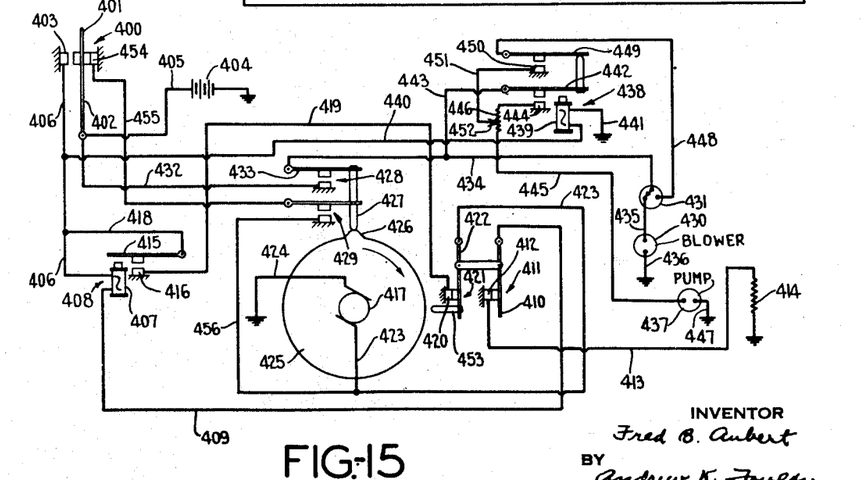
Fig. 15 is a diagrammatic view of another form of control system having an electric drive.

In Fig. 15 another form of electrically driven timing motor control is shown. In this figure a single operating cam rotatable in one direction only is employed and the manual reverse cam operation for starting of the heating apparatus is eliminated. When it is desired to start the burner of the heating apparatus in operation, the main switch 400, which is a double throw manual switch having an operating extension or lever 401 operatively connected to its switch arm 402 is moved to the left facing Fig. 15 to engage the switch arm contact with the fixed switch contact 403, so that a circuit from the battery or source of current supply 404 is completed through the lead wire 405 to and through the switch 400 and thence through lead wire 406 to one terminal of the coil 407 of the timing motor controlling relay switch 408. From the other terminal of coil 407, a lead wire 409 extends to the switch arm 410 of a normally closed cam operated switch 411. From the fixed contact 412 of the snap acting switch 411 a lead wire 413 connects to one terminal of the hot wire igniting means 414 which has its other terminal connected to ground. Operation of switch 400 to close circuit through its contact 403 therefore energizes the igniter 414 and actuates the relay switch 408, provided the igniter circuit is complete and the current supply is sufficient to actuate the relay switch 408 as described above in connection with Figs. 1 to 11. The operation of relay switch 408 pulls the relay switch arm 415 into engagement with the fixed relay contact 416 to close the circuit of the timing motor 417 as follows: From main switch lead wire 406 through lead wire 418, to relay switch arm 415 and its engaged contact 416 to lead wire 419, connected to the closed contact 420 of the normally closed cam operated snap acting switch 421, having its switch arm 422 movable, linked for movement in unison with switch arm 410. From the switch arm 422 a lead wire 423 extends to one terminal of the timing motor 417, which has its other terminal connected to ground by a lead wire 424. Energization of timing motor 417 drives its cam member 425 to move the cam clockwise in the direction of the arrow facing Fig. 15, to move cam 426 out of holding relation to the cam follower thrust member 427 so that the snap acting switches 428 and 429 are moved to closed position. Closure of the blower control switch 428 completes a circuit to the combustion air supplying blower motor 430 through the combustion air pressure responsive or ram switch 431 as follows: From battery lead wire 405 through lead wire 432 to the fixed contact of switch 428, and from its cam operated switch arm 433 via lead wire 434, to the normally closed contacts of ram switch 431 and therethrough to the lead wire 435 connected to one terminal of the blower motor 430 having its other terminal connected to ground by lead wire 436. The main switch 400, upon engagement with its contact 403, also controls the motor of the fuel supply pump 437 through the intermediary of relay switch 438. Engagement of switch arm 402 and contact 403, which closes the circuit from the battery 404 to lead wire 406, energizes the relay switch coil 439 having one terminal connected by lead wire 440 to the lead wire 406 and having its other terminal connected to ground by lead wire 441. The cam operated blower switch 428 also controls the energization of the fuel pump motor 437 as it is in series circuit with the low speed fuel pump switch arm 442 by lead wire 443, connected to lead wire 434. Closure of relay switch 438 engages the arm 442 with fixed contact 444, thereby completing the circuit to one terminal of the pump motor 437 via lead wire 445 having therein the low speed resistance 446, the other terminal of the pump motor being connected to ground by lead wire 447. The heating apparatus will now be in operation at low fuel consumption to supply the desired amount of heat in accordance with the combustion or supply provided by the blower. Upon increase in the pressure of the combustion air about the pressure provided by the blower, such as will occur when the aircraft is in flight, the ram switch 431 will break circuit between the blower motor supplying lead wires 434 and 435 and will make circuit from the lead wire to the lead 448 connected to the switch arm 449 of relay switch 438 and movable in unison with the switch arm 442. Since the switch arm 449 is in engagement with fixed relay contact 450, the circuit will be completed from lead wire 448 to the lead wire 451 which connects to the adjustable contact 452 of the resistance 446, thereby shunting out a portion of the resistance 446 to increase the speed of the fuel pump motor 437, in order to provide the necessary quantity of fuel for a proper fuel air mixture with the increased combustion air supply.

The cam member 425 has been rotating at a predetermined rate, preferably a 20 minute cycle, and when the cam 426 has been rotated through 90° it will, at the end of the five minute period, engage the follower thrust member 453 to operate the arms 422 and 410 of the switches 421 and 411 respectively to break the circuit of the timer motor 417 and of the igniter 414. Although the circuit to the timing motor 417 is broken at the relay switch 408 upon opening of switch 411 which de-energizes the relay coil 407, the switch 421 provides a safety control to assure stopping of the timing motor 417 in the event relay switch 408 should fail to open. Upon operation as above described, either at low or high fuel, consumption will not be affected by the time of operation of follower member 453 by cam 426. When it is desired to stop operation of the burner, the switch operating member 401 is moved to the position shown in this Fig. 15 in which switch arm 402 engages the fixed contact 454 so that the timing motor 417 is reenergized from the battery 404 through the following circuit: From switch contact 454, through lead wire 455 to the closed cam switch 429 and thence via lead wire 456 to the timing motor lead wire 423. Accordingly, if during the interval of reinstated timer motor operation the combustion air pressure has decreased below the predetermined blower pressure at which ram switch 431 remakes circuit between lead wires 434 and 435, the blower motor 430 will again be placed in operation to provide scavenging air for the combustion chamber. Upon the termination of the reinstated operating period of 15 minutes of the timing motor 417, the cam 426 will engage the follower member 427 to open the cam switches 428 and 429 to break the circuits of and stop the blower motor 430 and the timing motor 417 respectively and halting or stopping the cam 426 in its position for the start of another burner heating period when desired.

Figure 16:
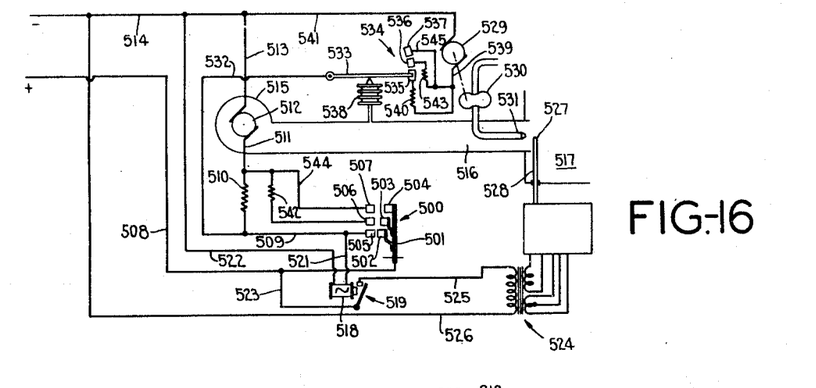
Fig. 16 is a diagrammatic view of a heating apparatus embodying the feature of the foregoing control systems of control of the fuel in accordance with the supply of combustion air as included in the systems of Figs. 11 to 15.

In Fig. 16 the heating apparatus is shown as having a multi-speed combustion air blower and as having high frequency spark ignition for the combustible fuel and air mixture such as disclosed in my co-pending joint application with Ross E. Scott, Serial No. 478,600 filed March 10, 1943, now Patent No. 2,444,239, granted June 29, 1948. In this form of the invention, the main switch 500 may be a temperature responsive automatic switch having a bimetal operated element 501 for actuating a plurality of switch contacts, namely a low speed contact 502, an intermediate higher speed contact 503 and a high speed contact 504 which are cooperable respectively with fixed contacts 505, 506 and 507. The blade 501 and its contacts are connected to a source of current supply via lead wire 508. Upon demand for heat or operation of the heating apparatus, the contact 502 is moved into engagement with the fixed contact 505, thereby completing a circuit through lead wire 509 to the low motor speed resistor 510 connected to the lead wire 511 of one terminal of the combustion air blower motor 512 having its other terminal connected by lead wire 513 to the return wire 514 connected to the source of current supply. Operation of the blower 515 by the motor 512 will supply combustion air under pressure through the air supply duct 516 to the combustion chamber 517. The engagement of contacts 502 and 505 will also close the circuit to the coil 518 of relay switch 519 controlling the burner ignition means 520, the coil being energized through lead wire 521 connecting the coil to the lead wire 501 and via the lead wire 522 extending from the coil to the return wire 514. The relay switch 519 is connected by lead wire 523 to the current supply wire 508 and to one terminal of the primary coil of a current supply transformer 524 by a lead wire 525, the other terminal of the transformer primary coil being connected to the return wire 514 by a lead wire 526. Therefore, the high frequency spark ignition means 520 will be energized simultaneously with the energization of the blower motor 512, with a resulting micro amperage radio frequency high voltage spark discharge from the end or tip 527 of the spark discharge electrode 528. Engagement of contacts 502 and 505 will also energize the motor 529 of the fuel supply pump 530 discharging fuel from a fuel tank not shown to and through the fuel nozzle 531 into the combustion chamber 517, the circuit of motor 529 being as follows: From the lead wire 509 on the switch controlled side of the resistor 510, a lead wire 532 connects to the switch arm 533 of a combustion air pressure responsive or ram switch 534 having a low speed contact 535, intermediate higher speed contact 536, and a high speed contact 537. At low combustion air pressure resulting from low blower motor speed, the pressure responsive member 538 of switch 534 will be holding the switch arm 533 in engagement with contact member 535 so that the current supply to the return wire 539 of the pump motor 529 will be through the low speed resistor 540 and from the other motor terminal via lead wire 541 to the return line wire 514. If the temperature should now decrease irrespective of operation of the heating apparatus, the switch 500 will move contact 503 into engagement with contact 506, thereby shunting the resistor 510 and supplying current to the blower motor 512 from supply line wire 508 through intermediate motor speed resistor 542 to the motor lead wire 511. The increased blower speed resulting from the cutting in of the lower resistance resistor 542 will increase the combustion air pressure and the quantity of air discharging through the duct 516 to the combustion chamber 517, thereby actuating the responsive member 538 of switch 534, so as to move switch arm 533 into circuit making engagement with the fixed switch contact 536. This will cut out the resistor 540 and establish the circuit to the motor lead wire 539 through the intermediate or lower resistance resistor 543, so that the proper ratio of fuel and air increased in quantity per unit of time will be supplied to the combustion chamber 517 to increase the heat supplied by the heating apparatus. If the contacts 504 and 507 of the switch 500 are now closed as by a further drop in temperature of the ambient medium affecting switch 500, then the resistors 510 and 542 will be shunted by a lead wire 544 connecting the switch contact 507 to the motor lead wire 511, with the result that the lower motor 512 will be operated at its highest speed, thereby to further increase the pressure or quantity of air discharged through the duct 516 to the combustion chamber 517. This further increased air pressure in the duct 516 will act on the switch responsive member 538 to move the switch arm 533 into electrical engagement with the high speed contact 537, so that the resistors 540 and 543 will be shunted out of the circuit of motor 529, the motor now being supplied with current from contact 537 by lead wire 545 to lead wire 539. This increased motor speed will increase the speed of the pump 530 so that the fuel supply will be increased in accordance with the increased supply of air through duct 516 in order to provide the desired combustible ratio of fuel to air at a further increased quantity or unit of time, thereby providing a further increased supply of heat by the heating apparatus. It will be apparent that as the heating apparatus raises the temperature of the ambient affecting switch 500 so that the contacts 504 and 507 and then the contacts 503 and 506 are separated, that the reverse operation of the burner will occur, cutting down the speed of the fuel pump in accordance with the decreasing speed of the blower motor an that when the switch 500 is satisfied and contact 502 is separated from contact 505, that the pump and blower motors will be deenergized and the relay switch 509 will be opened to deenergize the ignition means 520.

It is to be understood that the ignition means of Figs. 16 could be utilized in the control systems of Figs. 11, 12, 14 and 15 if the safety feature of the series circuit arrangement of the relay coil and hot wire igniter were considered unnecessary but that the ignition means 520 of Fig. 16 could be utilized in the systems of Figs. 11, 12, 14 and 15 with the safety means disclosed in the above mentioned co-pending application as another method of accomplishing the assurance of proper ignition means operation.

What is claimed and is desired to be secured by Letters Patents of the United States is:

1. A heating apparatus comprising a combustion chamber, means to supply fluid fuel to said chamber, a circuit for said means, electric ignition means for the fuel supplied to said chamber, a circuit for said ignition means, a relay switch having a coil in circuit with said ignition means, electromagnetic holding means having an armature and having a coil, a circuit for said holding means coil and controlled by said relay switch, a switch controlling the circuit of said ignition means and said relay coil, a switch in circuit with said relay switch to control said holding means coil, said last-named switch being movable with said armature and controlling the circuit of said fuel supply means, means to close said relay coil controlling switch, and means operated by said last-named means to close said fuel supply switch and to move said armature into holding relation to said holding means coil.

2. A heating apparatus comprising a combustion chamber, means to supply fluid fuel to said chamber, a circuit for said means, electric ignition means for the fuel supplied to said chamber, a circuit for said ignition means, a relay switch having a coil in circuit with said ignition means, electro-magnetic holding means having an armature and having a coil, a circuit for said holding means coil and controlled by said relay switch, a switch controlling the circuit of said ignition means and said relay coil, a switch in circuit with said relay switch to control said holding means coil, said last-named switch being movable with said armature and controlling the circuit of said fuel supply means, means to close said relay coil controlling switch, means operated by said last-named means to close said fuel supply switch and to move said armature into holding relation to said holding means coil, means tending to move said fuel supply switch to open position, and means to deenergize said holding means for operation of said fuel supply switch by said tending means.

3. A heating apparatus comprising a combustion chamber, means to supply fluid fuel to said chamber, a circuit for said means, means to supply combustion air under pressure to said chamber, a circuit for said air supply means, electric ignition means for the fuel supplied to said chamber, a circuit for said ignition means, a relay switch having a coil in circuit with said ignition means, electro-magnetic holding means having an armature and having a coil, a circuit for said holding means coil and controlled by said relay switch, a switch controlling the circuit of said air supply means, a switch controlling the circuit of said ignition means and said relay coil, a switch in circuit with said relay switch to control said holding means coil, said last-named switch being movable with said armature and controlling the circuit of said fuel supply means, means to close said air supply switch and said relay coil controlling switch, and means operated by said last-named means to close said fuel supply switch and to move said armature into holding relation to said holding means coil.

4. A heating apparatus comprising a combustion chamber, means to supply fluid fuel to said chamber, a circuit for said means, means to supply combustion air under pressure to said chamber, a circuit for said air supply means, electric ignition means for the fuel supplied to said chamber, a circuit for said ignition means, a relay switch having a coil in circuit with said ignition means, electro-magnetic holding means having an armature and having a coil, a circuit for said holding means coil and controlled by said relay switch, a switch controlling the circuit of said air supply means, a switch controlling the circuit of said ignition means and said relay coil, a switch in circuit with said relay switch to control said holding means coil, said last-named switch being movable with said armature and controlling the circuit of said fuel supply means, a settable timing means for operating certain of said switches for a heating cycle, drive means operated upon setting of said timing means to start a heating cycle and acting to close said air supply switch and said relay coil controlling switch, and means operated upon said setting of said timing means to close said fuel supply switch and to move said armature into holding relation to said holding means coil.

5. A heating apparatus comprising a combustion chamber, means to supply fluid fuel to said chamber, a circuit for said means, means to supply combustion air under pressure to said chamber, a circuit for said air supply means, electric ignition means for the fuel supplied to said chamber, a circuit for said ignition means, a relay switch having a coil in circuit with said ignition means, electro-magnetic holding means having an armature and having a coil, a circuit for said holding means coil and controlled by said relay switch, a switch controlling the circuit of said air supply means, a switch controlling the circuit of said ignition means and said relay coil, a switch in circuit with said relay switch to control said holding means coil, said last-named switch being movable with said armature and controlling the circuit of said fuel supply means, a settable timing means, drive means operated upon setting of said timing means to start a heating cycle and acting to close said air supply switch and said relay coil controlling switch, and means operated upon setting of said timing means to close said fuel supply switch and to move said armature into holding relation to said holding means coil, said timing means acting upon operation to actuate said drive means to open said ignition controlling switch.

6. A heating apparatus comprising a combustion chamber, means to supply fluid fuel to said chamber, a circuit for said means, means to supply combustion air under pressure to said chamber, a circuit for said air supply means, electric ignition means for the fuel supplied to said chamber, a circuit for said ignition means, a relay switch having a coil in circuit with said ignition means, electro-magnetic holding means having an armature and having a coil, a circuit for said holding means coil and controlled by said relay switch, a switch controlling the circuit of said air supply means, a switch controlling the circuit of said ignition means and said relay coil, a switch in circuit with said relay switch to control said holding means coil, said last-named switch being movable with said armature and controlling the circuit of said fuel supply means, a settable timing means, drive means operated upon setting of said timing means for the start of a heating cycle and acting to close said air supply switch and said relay coil controlling switch, and means operated upon said setting of said timing means to close said fuel supply switch and to move said armature into holding relation to said holding means coil, said timing means acting upon operation to actuate said drive means to open said ignition and relay coil controlling switch, means controlled by said holding means to stop operation of said timing means following switch opening actuation by said drive means, means tending to open said fuel supply switch and to move said armature out of said holding relation, and means to deenergize said holding means coil.

7. A heating apparatus comprising a combustion chamber, means including a blower for supplying air under pressure to said chamber, electrically controlled means to supply fuel at different rates of flow to said chamber, a circuit for said electrically controlled means, electrical ignition means for the fuel supplied to said chamber, a circuit for said ignition means, a relay switch having its coil in circuit with said ignition means, a switch controlling the circuit of said coil, means responsive to an increased pressure of the air supplied to said chamber, means operated by said responsive means and controlling said electrically controlled means to increase the rate of fuel supply to said chamber, switch means controlling the energization of said first-named circuit, and electrically operated means for maintaining closure of said switch means and including a circuit controlled by said relay switch.

8. A heating apparatus for aircraft comprising a combustion chamber having an air inlet, a blower for supplying air to said inlet, a circuit for said blower, a duct leading to the exterior of the aircraft for supplying air to said inlet by flight created air pressure, means to supply fuel to said chamber at a low rate and at a higher rate, high rate and low rate circuits for said fuel supply means, electric ignition means for the fuel supplied to said chamber, a circuit for said ignition means, a switch controlling the circuits of said blower and of said ignition means, a relay switch having its coil controlled by said switch, said coil being in said ignition means circuit and responsive to current flow therethrough so that said relay switch will close only upon flow of sufficient current to energize said ignition means for ignition of fuel, said relay switch controlling said low rate fuel supply circuit, a pressure switch responsive to air pressure in said duct and controlling said high rate fuel supply circuit to supply fuel at said higher rate upon the occurrence of a high air pressure in said duct, switch means for controlling current flow to said fuel supply means circuits, and holding means energized by closure of said relay switch and operable to control said switch means and said first-named switch.

9. A heating apparatus comprising a combustion chamber having an air inlet, electric ignition means in said chamber, a circuit for said ignition means, a relay switch having its coil in circuit with said means, a switch controlling the circuit of said coil and said ignition means, fuel supply means for said chamber, a circuit for said fuel supply means and controlled by said relay switch, electro-magnetic holding means having an armature and having a coil, a circuit for said holding means coil and controlled by said relay switch, a switch in circuit with said relay switch and controlling the circuits of said holding means coil and said fuel supply means, means operable to close said last-named switch and to move said armature into holding relation to said holding means coil, means overcome by the force of said holding means coil and tending to move said armature away from said holding means coil and to move said last-named switch to open position, a manually wound timing motor, means operable upon winding of said motor to close said relay coil controlling switch, lost-motion means connecting said last-named means and said armature operating means so that said timing motor can operate said last-named means while said armature is held by said holding coil, said holding coil acting through said lost-motion means to hold said timing motor against operation upon movement of said relay coil controlling switch to open position by said timing motor, and means to deenergize said holding coil to release said armature and said timing motor.

10. A heating apparatus comprising a combustion chamber, a blower for supplying air to said chamber, a circuit for said blower, electrically operable means for supplying fuel to said chamber, a circuit for said means, hot wire ignition means in said chamber, a circuit for said ignition means, a main switch controlling the circuits of said blower and said fuel supply means, a double throw switch having a first position with normally closed contacts controlling the circuit from said main switch to said fuel supply means, a relay switch shunting said normally closed contacts and having an operating coil in circuit with said ignition means, said double throw switch in said first position having normally open contacts controlling current flow to said relay operating coil and said ignition means, electro-magnetic holding means having a coil and an armature, a circuit for said holding means coil, a switch controlling the circuit of said holding means coil and the circuit of said fuel supply means, a settable timing motor having a predetermined running time, a plurality of cams movable by setting of said motor, two of said cams being movable in unison and being operable respectively upon setting of said motor first to close said main switch and then to actuate said double throw switch to close said normally open contacts and to open said normally closed contacts, a third one of said cams being movable with said armature and acting at the limit of setting of said motor to close said holding means coil switch, means opposing movement of said third cam to close said holding means coil switch, said armature at said limit being moved against the force of said opposing means and into holding relation to said holding means coil, means to stop said motor upon cam operation of said double throw switch to said first position to break the circuit of said ignition means, and means to deenergize said holding means to reinstate operation of said two cams by said timing motor and to release said opposing means to actuate said third cam to deenergize said fuel supply means.

11. A heating apparatus comprising a combustion chamber, a blower for supplying air to said chamber, a circuit for said blower, a main switch controlling the circuit of said blower, a manually set timing motor, a cam driven by said motor and operable to open said main switch, electrically energized fuel supply means for said chamber, a circuit for said fuel supply means, hot wire ignition means in said chamber, a circuit for said ignition means, a relay switch controlling the circuit of said fuel supply means and having an operating coil in circuit with said ignition means, a switch controlling the circuit of said operating coil and said ignition means, a switch in shunt with said relay switch, a cam driven by said motor and operable upon a predetermined lapse of time to close said shunt switch and to open said operating coil and ignition means switch, a fuel supply means stopping switch in circuit with said shunt switch and said relay switch, a cam controlled by said motor and operable to hold said stopping switch closed, electro-magnetic holding means operable to hold said last-named cam against movement upon operation of said motor, a circuit for said holding means, and a switch operable to open the circuit of said holding means to stop said fuel supply means.

12. A heating apparatus comprising a combustion chamber, a blower for supplying air to said chamber, a circuit for said blower, a main switch controlling the circuit of said blower, a manually set timing motor, a cam driven by said motor and operable to open said main switch, electrically energized fuel supply means for said chamber, a circuit for said fuel supply means, hot wire ignition means in said chamber, a circuit for said ignition means, a relay switch controlling the circuit of said fuel supply means and having an operating coil in circuit with said ignition means, a switch controlling the circuit of said operating coil and said ignition means, a switch in shunt with said relay switch, a cam driven by said motor and operable upon a predetermined lapse of time to close said shunt switch and to open said operating coil and ignition means switch, a fuel supply means stopping switch in circuit with said shunt switch and said relay switch, a cam movable relative to said first-named and said second-named cams and controlled by said motor and operable to hold said stopping switch closed, electro-magnetic holding means operable to hold said last-named cam against movement upon operation of said motor, a circuit for said holding means, said cams being operated upon setting of said motor and being so constructed and arranged that said first-named cam closes said main switch to start said blower, then said second-named cam opens said shunt switch and closes said operating coil and ignition switch, and finally said third-named cam closes said stopping switch, means operable to stop said motor upon motor operation of said shunt and ignition means switches by said second-named cam, and a switch to break the circuit of said holding means thereby to stop operation of said fuel supply means.

13. In a heating apparatus, electrically energized fuel supply means, a circuit for said means, hot wire ignition means for the supplied fuel, a circuit for said ignition means, manually settable timing means, a relay switch controlling the circuit to said supply means and having its coil in series circuit with said ignition means, a main switch controlling the circuit of said coil and the circuit of said supply means, a second switch having normally closed contacts shunting said relay switch and having normally open contacts in series circuit with said coil, a cam driven by said timing means and operable upon setting of said timing means to open said normally closed contacts and to close said normally open contacts so that said relay switch will energize said fuel supply means, said cam acting upon predetermined running of said timing means to open said normally open contacts and to close said normally closed contacts thereby to maintain said supply means energized, and means to stop the running of said timing means upon opening of said normally open contacts.

14. In a heating apparatus, electrically energized fuel supply means, a circuit for said means, hot wire ignition means for the supplied fuel, a circuit for said ignition means, manually settable timing means, a relay switch controlling the circuit to said supply means and having its coil in series circuit with said ignition means, a main switch controlling the circuit of said coil and the circuit of said supply means, a second switch having normally closed contacts shunting said relay switch and having normally open contacts in series circuit with said coil, a cam driven by said timing means and operable upon setting of said timing means to open said normally closed contacts and to close said normally open contacts so that said relay switch will energize said fuel supply means, said cam acting upon predetermined running of said timing means to open said normally open contacts and to close said normally closed contacts thereby to maintain said supply means energized, means to stop the running of said timing means upon opening of said normally open contacts, an electrically driven blower for supplying air for combustion, a circuit for said blower, said main switch controlling the circuit of said blower, a cam operable to close said main switch upon setting of said timing means, said last-named cam being driven by said timing means and operable upon predetermined running of said timing means to open said main switch thereby to stop said blower, a switch controlling the circuit of said fuel supply means, and means operable upon opening of said last-named switch to restart running of said timing means thereby to determine the duration of operation of said blower subsequent to opening of said last-named switch.

15. A heating apparatus comprising a combustion chamber, a duct for supplying combustion air to said chamber, a blower having a motor and for supplying air under pressure to said duct, a circuit for said motor, said duct having an opening for admission of air at greater pressure to said chamber than the pressure supplied by said blower, a pump for supplying fuel to said chamber, a multi-speed motor for driving said pump, said pump motor having a low speed for supplying fuel in accordance with the air supplied by said blower and having a higher speed for supplying fuel in accordance with the greater air pressure, circuits for said pump motor, a hand wound timing motor, a shaft driven by said timing motor, a second shaft driven by and having lost motion relative to said first-named shaft, a plurality of cams fixed on said first-named shaft, a normally open main switch controlling the circuit of said blower motor and controlled by one of said cams, a hot wire ignition means in said combustion chamber, a circuit for said ignition means, a relay switch controlling the low speed circuit of said pump motor and having its relay coil in series circuit with said ignition means, a double-throw switch controlled by another of said cams and having normally closed contacts in shunt with said relay switch and having normally open contacts controlling the circuit to said relay coil, a pump motor cam fixed on said second shaft, a pair of normally open switches controlled by said pump motor cam, one of said pair of switches being in series circuit with said normally closed contacts of said double-throw switch and with said relay switch, the other of said pair of switches controlling the higher speed circuit of said pump motor, a pressure actuated double-throw switch responsive to pressure in said duct and having normally closed contacts controlling the circuit of said blower motor and having normally open contacts in series circuit with said other of said pair of switches, a holding magnet, a circuit for said holding magnet and controlled by said one of said pair of switches and by said relay switch, an armature cooperable with said magnet and rigid with said pump motor cam, a spring resisting movement of said armature into holding relation to said magnet, said one cam acting upon initial winding of said timing motor to close said main switch, said other cam acting to operate said first-named double-throw switch for predetermined operation of said ignition means upon running of said timing motor, said pump motor cam acting to close said pair of switches, said magnet acting through said holding magnet circuit being controlled by said relay switch during said predetermined ignition means operation, said second shaft at the limit of lost-motion of said second shaft to stop the running of said timing motor and acting through said armature and said pump motor cam to maintain said pair of switches closed for energization of said high speed pump motor circuit, and a normally closed stopping switch in the circuit of said magnet for deenergizing said magnet to release said timing motor for operation and to release said pump motor cam for opening of said pair of switches.

16. A heating apparatus comprising a combustion chamber, a duct for supplying combustion air to said chamber, a blower having a motor and for supplying air under pressure to said duct, a circuit for said motor, said duct having an opening for admission of air at greater pressure to said chamber than the pressure supplied by said blower, a pump for supplying fuel to said chamber, a multi-speed motor for driving said pump, said pump motor having a low speed for supplying fuel in accordance with the air supplied by said blower and having a higher speed for supplying fuel in accordance with the greater air pressure, circuits for said pump motor, a hand wound timing motor, a shaft driven by said timing motor, a second shaft driven by and having lost motion relative to said first-named shaft, a plurality of cams fixed on said first-named shaft, a normally open main switch controlling the circuit of said blower motor and controlled by one of said cams, a hot wire ignition means in said combustion chamber, a circuit for said ignition means, a relay switch controlling the low speed circuit of said pump motor and having its relay coil in series circuit with said ignition means, a double-throw switch controlled by another of said cams and having normally closed contacts in shunt with said relay switch and having normally open contacts controlling the circuit to said relay coil, a resistance for low speed pump motor operation in series circuit with said relay switch and said normally closed contacts of said double-throw switch, a pump motor cam fixed on said second shaft, a normally open switch means arranged for closure by said pump motor cam and in and controlling said high speed pump motor circuit, a pressure actuated double-throw switch responsive to pressure in said duct and having normally closed contacts controlling the circuit of said blower motor and having normally open contacts in shunt circuit with said resistance and said normally closed contacts of said double-throw switch, a holding magnet, a circuit for said magnet and controlled by said pump motor cam switch means and said relay switch, an armature cooperable with said magnet and rigid with said pump motor cam, a spring resisting movement of said armature into holding relation to said magnet, said one cam acting upon initial winding of said timing motor to close said main switch, said other cam acting to operate said first-named double-throw switch for predetermined operation of said ignition means upon running of said timing motor, said magnet acting through said second shaft at the limit of lost-motion of said second shaft to stop the running of said timing motor and acting through said armature and said pump motor cam to maintain said normally open switch means closed for energization of said high speed pump motor circuit, and a normally closed stopping switch in the circuit of said magnet for deenergizing said magnet to release said timing motor for operation and to release said pump motor cam for opening of its normally open switch means to stop said pump motor, said relay switch controlling said holding magnet circuit during said predetermined ignition means operation.

17. A heating apparatus comprising a combustion chamber, a duct for supplying combustion air to said chamber, a blower having a motor and for supplying air under pressure to said duct, a circuit for said blower motor, said duct having an opening for admission of air at greater pressure to said chamber than the pressure supplied by said blower, a pump for supplying fuel to said chamber, a multi-speed motor for driving said pump, said pump motor having a low speed for supplying fuel in accordance with the air supplied by said blower and having a higher speed for supplying fuel in accordance with the greater air pressure, circuits for said pump motor, an electrically driven timing motor, a shaft driven by said timing motor, an automatic clutch connecting said timing motor to said shaft, a second shaft driven by and having lost motion relative to said first-named shaft, a plurality of cams fixed on said first-named shaft, a normally open main switch controlling the circuit of said blower motor and controlled by one of said cams, a hot wire ignition means in said combustion chamber, a circuit for said ignition means, a relay switch controlling the circuit of said timing motor and the low speed circuit of said pump motor and having its relay coil in series circuit with said ignition means, a double-throw switch controlled by another of said cams and having normally closed contacts in shunt with said relay switch and having normally open contacts controlling the circuit to said relay coil, a pump motor cam fixed on said second shaft, a pair of normally open switches controlled by said pump motor cam, one of said pair of switches being in series circuit with said normally closed contacts of said double-throw switch and with said relay switch, the other of said pair of switches controlling the higher speed circuit of said pump motor, a pressure actuated double-throw switch responsive to pressure in said duct and having normally closed contacts controlling the circuit of said blower motor and having normally open contacts in series circuit with said other of said pair of switches, a holding magnet, a circuit for said holding magnet and controlled by said one of said pair of switches and by said relay switch, an armature cooperable with said magnet and rigid with said pump motor cam, a spring resisting movement of said armature into holding relation to said magnet, said one cam acting upon initial winding of said timing motor to close said main switch, said other cam acting to operate said first-named double-throw switch for predetermined operation of said ignition means upon running of said timing motor, said pump motor cam acting to close said pair of switches, said holding magnet acting through said armature and said pump motor cam to maintain said pair of switches closed for energiztion of said high speed pump motor circuit, a normally closed timing motor switch in series circuit with said main switch and controlled by said pump motor cam, and a normally closed stopping switch in the circuit of said magnet for deenergizing said magnet to release said timing motor for operation and to release said pump motor cam for opening of said pair of switches and closure of said normally closed timing motor switch, said holding magnet circuit being controlled by said relay switch during said predetermined ignition means operation.

18. A burner controlling apparatus comprising a hand wound timing motor, electrically operated fuel supply means, a circuit for said means, a hot wire ignition means, a circuit for said ignition means, a relay switch controlling the circuit to said fuel supply means and having a coil in series with said ignition means, a switch closed by winding of said timing motor and controlling the circuit of said coil so that operation of said relay switch is dependent upon operation of said ignition means, and a switch closed by operation of said timing motor for maintaining said fuel supply means energized upon opening of said coil circuit controlling switch by said timing motor.

19. A burner controlling apparatus comprising a hand wound timing motor, electrically operated fuel supply means, a circuit for said means, a hot wire ignition means, a circuit for said ignition means, a relay switch controlling the circuit to said fuel supply means and having a coil in series with said ignition means, a switch closed by winding of said timing motor and controlling the circuit of said coil so that operation of said relay switch is dependent upon operation of said ignition means, a switch closed by operation of said timing motor for maintaining said fuel supply means energized upon opening of said coil circuit controlling switch by said timing motor, an electrically driven blower for supplying combustion air, a circuit for said blower, a switch closed to start said blower upon winding of said motor, means to stop said motor upon opening of said coil circuit, a switch for deenergizing said fuel supply means, and means to start said motor upon operation of said last-named switch thereby to determine the duration of operation of said blower subsequent to operation of said last-named switch.

20. A heating apparatus comprising a combustion chamber, means for supplying air at low and at high pressures to said chamber and including a blower, a circuit for said blower, electrically controlled means for supplying fuel at low and at high rates of flow to said chamber, a low rate controlling circuit for said electrically controlled means, a high rate controlling circuit for said electrically controlled means, means to close said blower circuit and said low rate circuit, a switch in said low rate circuit and biased to open position, a switch in said high rate circuit and biased to open position, electrically energized holding means for maintaining said switches closed, a circuit for said holding means, a relay switch having an operating coil and controlling said holding means circuit, means responsive to the high air pressure, means operated by said responsive means to close said high rate controlling circuit to supply fuel to said chamber at the high rate of fuel flow, a circuit for said operating coil, a hot wire igniter in said chamber and in said operating coil circuit so that upon failure of said igniter said relay switch will open said holding coil circuit thereby to open said high rate circuit switch and said low rate circuit switch.

21. A heating apparatus comprising a combustion chamber, means to supply fluid fuel at different rates to said chamber, high and low fuel supply circuits for said means, electric ignition means for the fuel supplied to said chamber, a circuit for said ignition means, a relay switch having a coil in circuit with said ignition means, electro-magnetic holding means having an armature and having a coil, a circuit for said holding means coil and controlled by said relay switch, a switch controlling the circuit of said ignition means and said relay coil, switch means in circuit with said relay switch to control said holding means coil, said last-named switch means being movable with said armature and controlling the circuits of said fuel supply means, means to close said relay coil controlling switch, means operated by said last-named means to close said fuel supply switch means and to move said armature into holding relation to said holding means coil, means controlling said high and low fuel circuits and operable to close said high fuel circuit to increase the supply of fuel by said fuel supply means, and said relay switch controlling the completion of said high fuel circuit by said last-named means.

FRED B. AUBERT.

REFERENCES CITED

The following references are of record in the file of this patent:

UNITED STATES PATENTS

| Number | Name | Date |
| --- | --- | --- |
| 1,535,240 | Morris | Apr. 28, 1925 |
| 1,562,663 | Strong | Nov. 24, 1925 |
| 1,635,809 | Carlson | July 12, 1927 |
| 1,694,053 | Booth | Dec. 4, 1928 |
| 1,708,918 | Good, et al. | Apr. 9, 1929 |
| 1,877,037 | Parker | Sept. 13, 1932 |
| 2,085,195 | Kerr | June 29, 1937 |
| 2,108,770 | Kriechbaum | Feb. 15, 1938 |
| 2,138,796 | Sparrow | Nov. 29, 1938 |
| 2,175,864 | Anderson | Oct. 10, 1939 |
| 2,212,352 | Plein | Aug. 20, 1940 |
| 2,251,055 | Howard et al. | July 29, 1941 |
| 2,319,360 | Wilson | May 18, 1943 |
| 2,385,699 | Fox | Sept. 25, 1946 |